(12) United States Patent
Rao et al.

(10) Patent No.: US 10,725,227 B2
(45) Date of Patent: *Jul. 28, 2020

(54) WIDE COLOR-GAMUT VEHICLE INFOTAINMENT DISPLAY SYSTEM

(71) Applicant: Harman International Industries, Incorporated, Stamford, CT (US)

(72) Inventors: Rashmi Rao, West Bloomfield, MI (US); Elijah Auger, Fenton, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/570,741

(22) PCT Filed: May 27, 2016

(86) PCT No.: PCT/US2016/034867
§ 371 (c)(1),
(2) Date: Oct. 30, 2017

(87) PCT Pub. No.: WO2016/196387
PCT Pub. Date: Dec. 8, 2016

(65) Prior Publication Data
US 2018/0292591 A1    Oct. 11, 2018

Related U.S. Application Data

(60) Provisional application No. 62/168,673, filed on May 29, 2015.

(51) Int. Cl.
*F21V 8/00* (2006.01)
*G02F 1/13357* (2006.01)
(Continued)

(52) U.S. Cl.
CPC .............. *G02B 6/005* (2013.01); *B60K 35/00* (2013.01); *G02F 1/13362* (2013.01);
(Continued)

(58) Field of Classification Search
None
See application file for complete search history.

(56) References Cited

U.S. PATENT DOCUMENTS 5,276,779 A * 1/1994 Statt ..................... H04N 1/6011
345/617
7,052,152 B2 * 5/2006 Harbers ............ G02F 1/133603
349/71

(Continued)

FOREIGN PATENT DOCUMENTS

EP    2711768 A1    3/2014
EP    3 304 186 A1    4/2018
(Continued)

OTHER PUBLICATIONS

Android ("Is it possible to turn an Android tablet on or off over a wired connection such as USB?", 2012, https://android.stackexchange.com/questions/29939/is-it-possible-to-turn-an-android-tablet-on-or-off-over-a-wired-connection-such (Year: 2012).*

(Continued)

*Primary Examiner* — Xin Sheng
(74) *Attorney, Agent, or Firm* — Artegis Law Group, LLP

(57) ABSTRACT

The various embodiments set forth a display device that includes a liquid crystal module, a nano-particle semiconductor material, and a light source that includes a blue light-emitting diode configured to generate a blue output light. The nano-particle semiconductor material is configured to receive the blue output light, convert a first portion of the blue output light to a green light emission, convert a second portion of the blue output light to a red light (Continued)

emission, and transmit a remainder portion of the blue output light. The liquid crystal module is configured to receive the green light emission, the red light emission, and the remainder portion of the blue output light and generate an image that includes a portion of the green light emission, a portion of the red light emission, and a portion of the remainder portion of the blue output light.

18 Claims, 5 Drawing Sheets

(51) Int. Cl.
*B60K 35/00* (2006.01)
*G02F 1/1335* (2006.01)
*G09G 3/34* (2006.01)
*G09G 3/36* (2006.01)

(52) U.S. Cl.
CPC .. *G02F 1/133514* (2013.01); *G02F 1/133609* (2013.01); *G09G 3/3413* (2013.01); *G09G 3/3607* (2013.01); *B60K 2370/188* (2019.05); *B60K 2370/25* (2019.05); *B60K 2370/331* (2019.05); *G02F 2001/133614* (2013.01); *G02F 2001/133624* (2013.01); *G09G 2330/026* (2013.01); *G09G 2380/10* (2013.01)

(56) References Cited

U.S. PATENT DOCUMENTS

| | | | |
|---|---|---|---|
| 8,294,168 | B2 | 10/2012 | Park et al. |
| 10,094,537 | B2 | 10/2018 | Asadi et al. |
| 2006/0002141 | A1 | 1/2006 | Ouderkirk et al. |
| 2007/0018558 | A1 | 1/2007 | Chua et al. |
| 2008/0246017 | A1 | 10/2008 | Gillies et al. |
| 2009/0201698 | A1 | 8/2009 | Klick et al. |
| 2011/0032450 | A1 | 2/2011 | Shigeta et al. |
| 2011/0273906 | A1 | 11/2011 | Nichol et al. |
| 2011/0303940 | A1 | 12/2011 | Lee et al. |
| 2012/0274882 | A1 | 11/2012 | Jung et al. |
| 2012/0287381 | A1 | 11/2012 | Li et al. |
| 2013/0114299 | A1 | 5/2013 | Lee |
| 2013/0235611 | A1 | 9/2013 | Franklin et al. |
| 2013/0322111 | A1 | 12/2013 | Nishitani et al. |
| 2013/0335671 | A1* | 12/2013 | Fleck .................. G02B 27/017 349/62 |
| 2014/0009959 | A1 | 1/2014 | Park |
| 2014/0016351 | A1 | 1/2014 | Park et al. |
| 2014/0125802 | A1* | 5/2014 | Beckert .................. H04N 5/213 348/148 |
| 2014/0132890 | A1 | 5/2014 | Zhang et al. |
| 2014/0204295 | A1 | 7/2014 | Weiss et al. |
| 2015/0103291 | A1 | 4/2015 | Li |
| 2015/0109814 | A1 | 4/2015 | Chen et al. |
| 2016/0313593 | A1 | 10/2016 | Grip |
| 2016/0363814 | A1 | 12/2016 | Liu et al. |
| 2017/0047486 | A1 | 2/2017 | Herrmann et al. |
| 2017/0052404 | A1 | 2/2017 | Kang et al. |
| 2017/0054053 | A1 | 2/2017 | Jeon et al. |
| 2017/0219184 | A1 | 8/2017 | Petluri et al. |
| 2017/0219758 | A1 | 8/2017 | Jang et al. |
| 2017/0229429 | A1 | 8/2017 | He et al. |
| 2017/0235041 | A1 | 8/2017 | Ninan et al. |
| 2018/0101068 | A1 | 4/2018 | Rao et al. |
| 2018/0107070 | A1 | 4/2018 | Rao et al. |
| 2018/0292591 | A1 | 10/2018 | Rao et al. |

FOREIGN PATENT DOCUMENTS

| | | | |
|---|---|---|---|
| KR | 10-2018-0013932 A | | 2/2018 |
| WO | 2012111893 A1 | | 8/2012 |
| WO | 2015045735 A1 | | 4/2015 |
| WO | 2016/196387 A1 | | 12/2016 |

OTHER PUBLICATIONS

Hong, Qi, et al. "High-efficiency quantum dot remote phosphor film." Applied optics 54.15 (2015): 4617-4622. (Year: 2015).*
Luo, Zhenyue, Yu-Wen Cheng, and Shin-Tson Wu. "Polarization-preserving light guide plate for a linearly polarized backlight." Journal of Display Technology 10.3 (2013): 208-214. (Year: 2013).*
International Search Report Application No. PCT/2016/034867, dated Oct. 13, 2016, 16 pages.
Non-final Office Action for U.S. Appl. No. 15/836,752 dated Dec. 13, 2018.
Non-Final Office Action received for U.S. Appl. No. 15/836,725 dated Mar. 22, 2019, 30 pages.
Final Office Action received for U.S. Appl. No. 15/836,725 dated Jun. 20, 2019, 18 pages.
Final Office Action received for U.S. Appl. No. 15/836,752 dated Apr. 8, 2019, 26 pages.
International Preliminary Report on Patentability received for PCT Application Application Serial No. PCT/US2016/034867 dated Dec. 14, 2017, 11 pages.
Partial Search Report for EP application No. EP16730582.0 dated Oct. 16, 2019.
Non-Final Office Action received for U.S. Appl. No. 15/836,725 dated Oct. 1, 2019, 32 pages.
Advisory Action received for U.S. Appl. No. 15/836,725 dated Aug. 12, 2019, 13 pages.
Non-Final Office Action received for U.S. Appl. No. 15/836,752 dated Jul. 30, 2019, 21 pages.
Advisory Action received in U.S. Appl. No. 15/836,752 dated Feb. 12, 2020, 3 pages.
Non-Final Office Action received for U.S. Appl. No. 15/836,752 dated Apr. 7, 2020, 19 pages.

* cited by examiner

WIDE COLOR-GAMUT VEHICLE INFOTAINMENT DISPLAY SYSTEM

CROSS-REFERENCE TO RELATED APPLICATIONS

The present application is a national stage application of the international application titled, "WIDE COLOR-GAMUT VEHICLE INFOTAINMENT DISPLAY SYSTEM," filed on May 27, 2016 and having Application No. PCT/US2016/034867, which claims the benefit of United States provisional application titled, "ENHANCED VEHICLE INFOTAINMENT DISPLAY SYSTEM," filed on May 29, 2015 and having Application No. 62/168,673. The subject matter of these related applications is hereby incorporated herein by reference.

BACKGROUND

Field of the Various Embodiments

The various embodiments relate generally to automotive design and, more specifically, to a wide color-gamut vehicle infotainment display system.

Description of the Related Art

In-vehicle infotainment (IVI), also referred to as in-car entertainment (ICE), includes the many hardware and software products, devices, and systems that can be integrated into or added to vehicles to enhance the driver and/or passenger experience. IVI has become a common feature in modern automobiles and other forms of transportation, and may provide audio or video entertainment, automotive navigation, driver assistance, video gaming capability, Internet connectivity, and the like to passengers and drivers.

Generally, the user interface for IVI systems includes a display screen, such as a liquid crystal display (LCD) screen. However, a well-known drawback of LCD-based display screens is that such display screens have a relatively limited color gamut, which is the specific range of colors reproducible by the screen that overlaps the range of colors identifiable by the human eye (i.e., the visible spectrum). For example, LCD-based display screens may have a color gamut of 72-74% of the National Television System Committee (NTSC) standard color gamut, which itself only includes a portion of all colors identifiable by the human eye. Consequently, some colors cannot be accurately displayed, and if such colors are intended to be rendered by the display, they will appear washed out and/or inaccurately depicted, degrading the viewing experience of IVI system users.

Accordingly, what would be useful is a vehicle infotainment display having improved color properties.

SUMMARY

The various embodiments set forth a display device that includes a liquid crystal module, a nano-particle semiconductor material, and a light source that includes a blue light-emitting diode configured to generate a blue output light. The nano-particle semiconductor material is configured to receive the blue output light, convert a first portion of the blue output light to a green light emission, convert a second portion of the blue output light to a red light emission, and transmit a remainder portion of the blue output light. The liquid crystal module is configured to receive the green light emission, the red light emission, and the remainder portion of the blue output light and generate an image that includes a portion of the green light emission, a portion of the red light emission, and a portion of the remainder portion of the blue output light.

At least one advantage of the disclosed embodiments is that a vehicle infotainment display device can have broader and more vibrant color than white-LED-based display devices.

BRIEF DESCRIPTION OF THE SEVERAL VIEWS OF THE DRAWINGS

So that the manner in which the above recited features of the various embodiments can be understood in detail, a more particular description of the various embodiments, briefly summarized above, may be had by reference to embodiments, some of which are illustrated in the appended drawings. It is to be noted, however, that the appended drawings illustrate only typical embodiments and are therefore not to be considered limiting of its scope, for the various embodiments may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
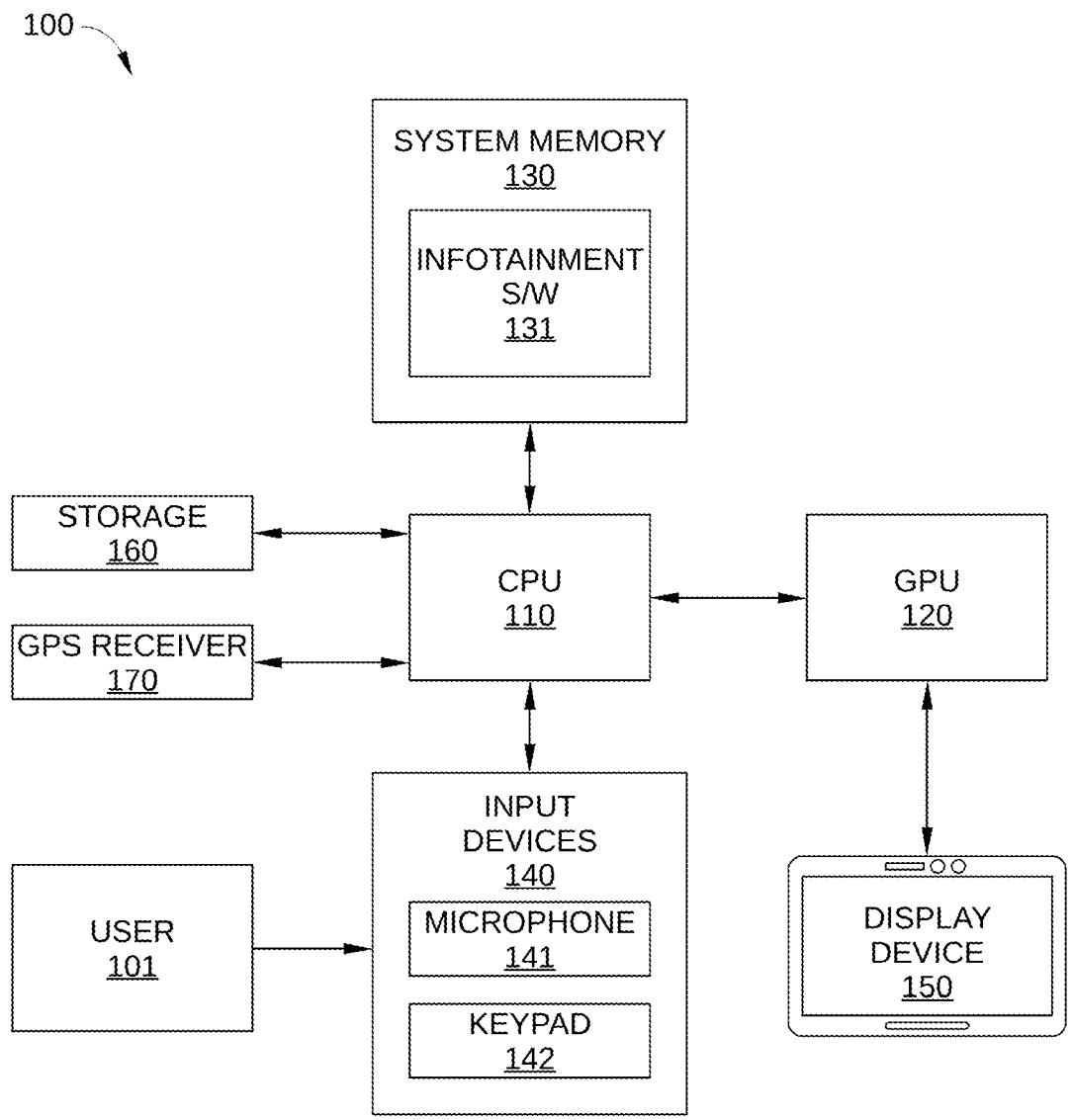
FIG. 1 is a block diagram illustrating a vehicular infotainment system configured to implement one or more aspects of the various embodiments.

FIG. 1 is a block diagram illustrating a vehicular infotainment system 100, configured according to various embodiments. Infotainment system 100 may be any technically feasible in-vehicle infotainment (IVI) system associated with a particular vehicle, and may include, without limitation, audio and/or video players, a video game console, one or more display devices, voice-recognition software, and the like.

In some embodiments, vehicular infotainment system 100 provides navigation information and other vehicle control information to a driver operating a vehicle. Specifically, for navigation, vehicular infotainment system 100 may be configured to accept input from a driver or other person (a "user" 101), including a destination location, to analyze road information, to calculate or determine one or more driving paths for the driver, to display such driving paths overlaid on a map, and to output associated driving instructions to the driver. Alternatively or additionally, vehicular infotainment system 100 may be configured to display controls to user 101 for controlling various equipment and devices within the vehicle. Such equipment and devices may include, without limitation, radio and other audio devices, multimedia players, wireless Internet devices, in-vehicle network devices, environmental control systems, cellular phone or other wireless communication devices, and the like.

In some embodiments, vehicular infotainment system 100 may be integrated in or include a head unit of an automotive stereo system, and may be configured as a subsystem of a vehicle control system associated with the vehicle and share computational resources therewith. In other embodiments, vehicular infotainment system 100 may be implemented as a stand-alone or add-on feature, part of the original equipment manufacturer (OEM) controls of the vehicle, or a combination of both.

As shown, vehicular infotainment system 100 may include, without limitation, a central processing unit (CPU) 110, a graphics processing unit (GPU) 120, system memory 130, input devices 140, one or more display devices 150, storage 160, and a global positioning system (GPS) receiver 170.

CPU 110 may be any suitable programmable processor implemented as a CPU, an application-specific integrated circuit (ASIC), a field programmable gate array (FPGA), any other type of processing unit, or a combination of different processing units. In general, CPU 110 may be any technically feasible hardware unit capable of processing data and/or executing software applications to facilitate operation of vehicular infotainment system 100 as described herein. GPU 120 may be any suitable programmable or fixed function processor that accepts commands and data from CPU 110 and generates images for display on display device 150. System memory 130 stores, among other things, infotainment software 131, which includes, without limitation, software for controlling the different equipment and devices associated with infotainment system 110, described above. System memory 130 generally comprises storage chips such as random access memory (RAM) chips that store applications and data for processing by CPU 110.

Input devices 140 enable user 101 to provide input to vehicular infotainment system 100 and/or, CPU 110. Thus, via user input devices 140, user 101 may select navigational targets, initiate telephone calls, and otherwise interact with vehicular infotainment system 100. User input devices 140 may include, without limitation, one or more microphones 141 and/or keypads 142. Microphone 141 enables voice-activated instructions to be received by vehicular infotainment system 100, while keypad 142 enables instructions to be entered via physical gestures on a touch-sensitive screen or actuation/depression of mechanical buttons. In some embodiments, keypad 142 may be configured as selectable alpha-numeric characters or soft keys displayed on a touch-sensitive screen. In such embodiments, the selectable alpha-numeric characters may be displayed by display device 150 or on a separate display device. Alternatively or additionally, keypad 142 may be configured with mechanical keys, such as a keyboard, or any other mechanical controller, such as a video gaming console. In some embodiments, one or more mechanical buttons of keypad 142 are located on the steering wheel of the vehicle or any other location separate from an alpha-numeric portion of the keyboard. For example, but without limitation, such separately located buttons may include on/off buttons, select buttons, mode change buttons, and the like.

Display device 150 may be a video display screen configured to present video media to user 101, such as output from a back-up camera, navigation information, entertainment content, environmental control system information, etc. Display device 150, along with one or more user input devices 140, may be integrated into a dashboard of the vehicle associated with vehicle infotainment system 100 or as an instrument cluster display. In some embodiments, display device 150 may not be incorporated into vehicle infotainment system 100, and may instead be a separate device. For example, and without limitation, display device 150 may be a component of a stand-alone navigation system. In some embodiments, display device 150 is configured with a touch-sensitive screen, and consequently may also be used as an input device by user 101. For example, and without limitation, in such embodiments, user 101 may make selections and/or enter data into vehicle infotainment system 100 via the touch interface 142 of display device 150. Embodiments of display device 150 are described in greater detail below in conjunction with FIGS. 2 and 3.

In various embodiments, storage 160 includes non-volatile memory such as optical drives, magnetic drives, flash drives, or other storage. GPS receiver 170 determines global position of the vehicle associated with vehicular infotainment system 100 based on one or more GPS satellites, various electromagnetic spectrum signals (such as cellular tower signals, wireless Internet signals, and the like), or other signals or measurements, or on a combination of the above items. In various embodiments, the infotainment software 131 accesses global positioning information from GPS receiver 170 to determine a current location of the vehicle.

In operation, the CPU 170 is the master processor of the infotainment system 110, controlling and coordinating operation of other system components. In particular, the CPU 170 receives input via input devices 140 and executes infotainment software 131 to output navigation and other infotainment-oriented information to display device 150.

Figure 2:
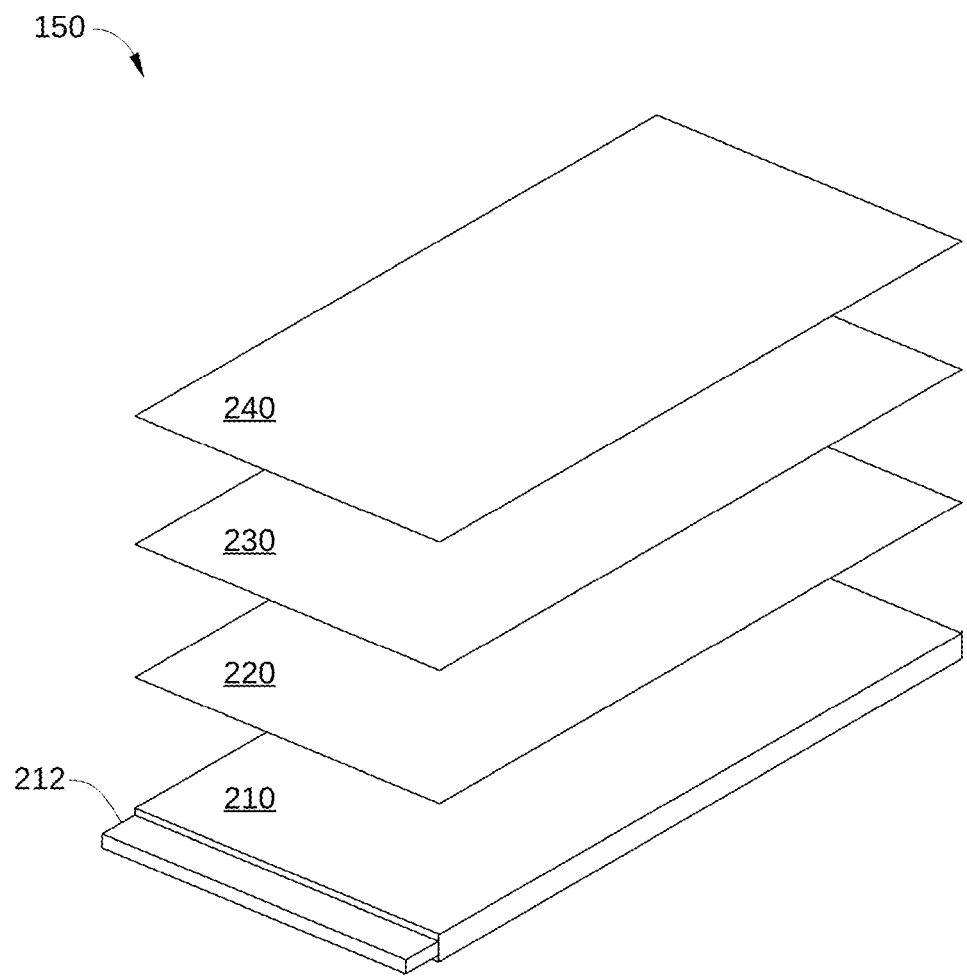
FIG. 2 is an exploded view of a display device of the vehicular infotainment system of FIG. 1, according to the various embodiments.
Figure 3:
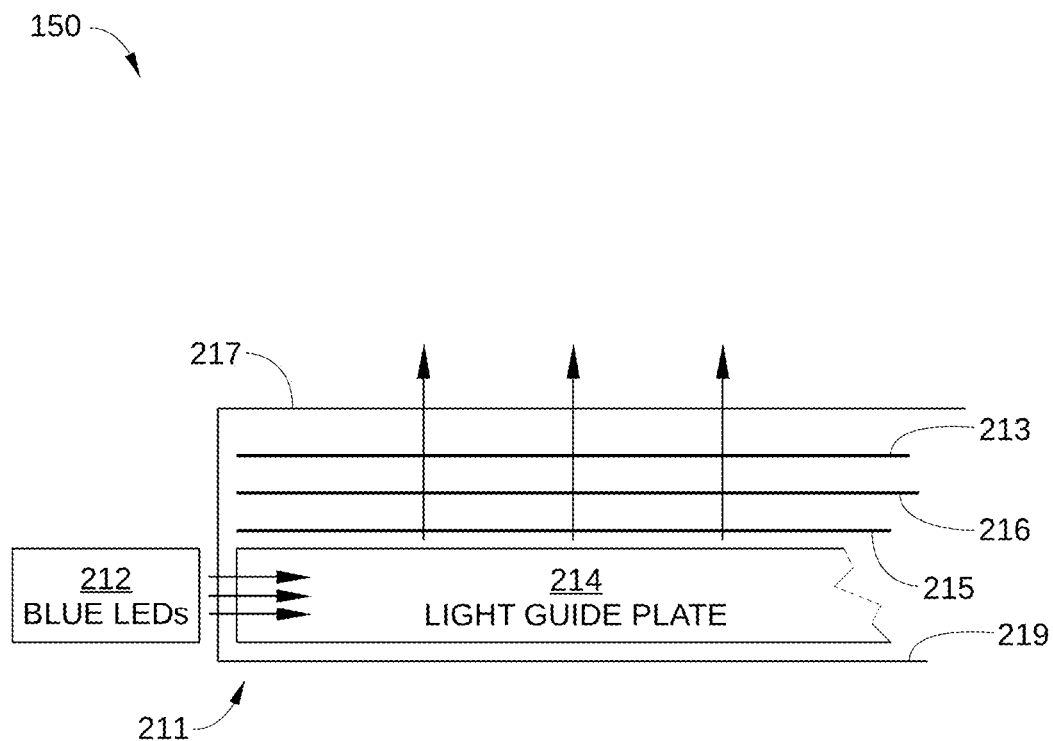
FIG. 3 is a partial schematic side view of the display device of the vehicular information system of FIG. 1, according to the various embodiments.

FIG. 2 is an exploded view of display device 150, according to the various embodiments, and FIG. 3 is a partial schematic side view of display device 150, according to the various embodiments. Display device 150 includes, without limitation, a back light unit (BLU) 210, a quantum dot (QD) material 220, a color filter assembly 230, and a liquid crystal (LC) panel 240, arranged as shown.

BLU 210 provides an evenly lit surface that acts as a light source of blue, polarized light for display device 150. BLU 210 may include, without limitation, a back panel 211 and a plurality of blue light-emitting diodes (LEDs) 212 disposed on one or more edges of back panel 211, such as gallium nitride (GaN) LEDs. In some embodiments, the blue light that is emitted by blue LEDs 212 and directed into back panel 211 has a wavelength between about 450 nm and about 495 nm. In some embodiments, the plurality of blue LEDs may be disposed on two opposing internal edges of back panel 211, or on all four internal edges of back panel 211.

Back panel 211 may include, without limitation, a reflector panel 219 disposed on the rear surface of back panel 211, at least one polarizing filter 213, a light guide plate 214, a diffuser film 215, and a prism film 216. Alternatively, light guide plate 214 and diffuser film 215 may be combined as a light diffuser element. For clarity, polarizing filter 213, light guide plate 214, diffuser film 215, and prism film 216 are omitted from FIG. 2. Polarizing filter 213 properly polarizes light emitted from BLU 210, and may be positioned between QD substrate 220 and BLU 210. Light guide plate 214 evenly distributes incident light from blue LEDs 212 across an emission surface 217 of BLU 210, via total internal reflection and in combination with extraction features incorporated in light guide plate 214 (such as a dot or groove pattern). Diffuser film 215 eliminates the dot pattern that may be included in light emitted from light guide plate 214, and prism film 216 increases the perpendicular component of the direction vector of emitted light to emission surface 217, since light typically emerges from light guide plate 214 at various angles. Thus, while light produced by blue LEDs 212 may enter back panel 211 along one or more edges, the blue polarized light leaving BLU 210 via emission surface 217 is bright and uniform in intensity, and somewhat perpendicular to emission surface 217.

QD substrate 220 is configured to convert part of the light emitted by BLU 210 into relatively pure green light and red light by the appropriately configured quantum dots, thereby enabling an efficient display with enhanced color properties. For example, in some embodiments, QD substrate 220 is an organic substrate, such as a polyimide film, in which quantum dots or quantum rods are embedded. A quantum dot is a semiconductor nanocrystal that is small enough to exhibit quantum mechanical properties, where the electronic characteristics of the quantum dot are closely related to the size and shape thereof. Specifically, the band gap in a quantum dot, which determines the frequency range of emitted light, is inversely related to the size of the quantum dot, so that larger quantum dots emit longer wavelengths (e.g., red), while smaller quantum dots emit shorter wavelengths (e.g., green). Thus, when a suitable number of quantum dots of a suitable size, shape, and composition are embedded in QD substrate 220, a selected portion of incident blue light from BLU 210 is converted into red light and into green light.

Because quantum dots naturally produce monochromatic light, they can be used to generate a spectrum of light that can be accurately matched with the colors of the filters in color filter assembly 230. Consequently, BLU 210, in conjunction with QD substrate 220, can provide a more efficient light source than white-LED-based light sources, which generally must be color filtered to produce white light. In addition, in contrast to the white light produced by a white-LED-based BLU, the white light produced by the combination of BLU 210 and QD substrate 220 allows for an improved color gamut, since the wavelengths of the green and red components can be selected by quantum dot geometry to be more saturated colors. This is because the more saturated red and green light generated by BLU 210 (in conjunction with QD substrate 220) enable a significantly wider gamut to be realized than when using the filtered red and green light available from white-LED-based light sources.

In the embodiment illustrated in FIGS. 2 and 3, QD substrate 220 is depicted as a separate structure from BLU 210. In some embodiments, however, QD substrate 220 may be included as an additional layer of BLU 210. In such embodiments, polarizing filter 213 may be positioned between QD substrate 220 and light guide plate 214, or between QD substrate 220 and LC panel 240. Alternatively, QD substrate 220 may be incorporated into one of the elements of BLU 210, such as polarizing filter 213, diffuser film 215, or prism film 216. A suitable configuration of QD substrate may be acquired from various manufacturers, including, but not limited to, 3M and Dow Chemical.

Color filter assembly 230 includes a filter that is configured as a short-wavelength pass filter with a passband configured to transmit light having a wavelength that falls within multiple predetermined wavelength ranges, thereby selectively passing light of a small range of colors while reflecting other colors. For example, in some embodiments, color filter assembly 230 is configured to be substantially transparent to red light (i.e., light having a wavelength at or near 650 nm), green light, (i.e., light having a wavelength at or near 510 nm) and blue light (i.e., light having a wavelength at or near 475 nm), while reflecting other visible light wavelengths. In some embodiments, color filter assembly 230 may include, without limitation, a dichroic filter. In the embodiment illustrated in FIGS. 2 and 3, color filter assembly 230 is depicted as a single substrate, such as a glass substrate with multiple coatings or films deposited thereon.

Color filter assembly 230 ensures that the light incident on LC panel 240 is white light that is substantially equivalent to the International Commission on Illumination (CIE) Standard Illuminant D65, i.e., the difference in such light and CIE Standard Illuminant D65 is not detectable to the human eye. Specifically, the passbands of color filter assembly 230 are selected so that light that is emitted by BLU 210, is partially converted to read and green light by QD substrate 220, and passes through color filter assembly 230 is such white light. In some embodiments, the passband of color filter assembly 230 that is associated with red light is generally matched to the red light emission of QD substrate 220 when illuminated by BLU 210, the passband of color filter assembly 230 that is associated with green light is generally matched to the green light emission of QD substrate 220 when illuminated by BLU 210, and the passband of color filter assembly 230 that is associated with blue light is generally matched to the light emitted by BLU 210. Thus, less optical energy is lost compared to the color filtering associated with white-LED-based BLUs.

Figure 4:
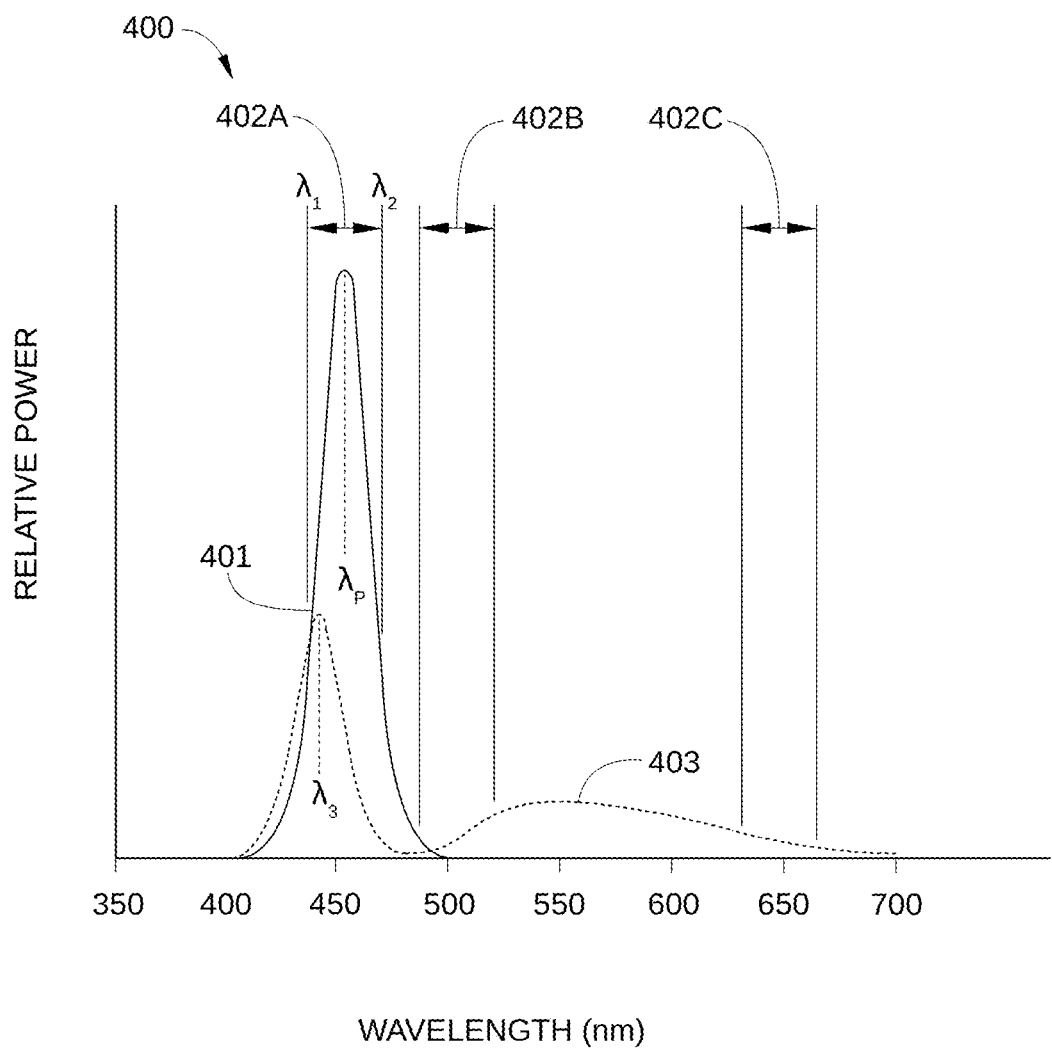
FIG. 4 is a graph illustrating the spectral power distribution of a light source juxtaposed with the multiple passbands of a color filter assembly included in the display device of FIGS. 2 and 3, according to the various embodiments.

In some embodiments, a passband of color filter assembly 230 is considered to be matched to a particular light emission when a peak frequency of the light emission falls within a passband of the color filter, as illustrated in FIG. 4. FIG. 4 is a graph 400 illustrating the spectral power distribution 401 of a light source juxtaposed with the multiple passbands 402A-402C of color filter assembly 230. As shown, passband 402A is in the blue light regime, passband 402B is in the green light regime, and passband 402C is in the red light regime. For purposes of illustration, spectral power distribution 401 depicts the spectral power distribution of a typical blue LED 212. However, the herein described matching of passband 402A to the light emission associated with spectral power distribution 401 is equally applicable to the matching of passband 402B of color filter assembly 230 to the red light emission of QD substrate 220 or the matching of passband 402C of color filter assembly 230 to the green light emission of QD substrate 220. This is because the red light emission of QD substrate 220 and the green light emission of QD substrate 220 are both narrow-band emissions with distinctive peak wavelengths.

As shown, spectral power distribution 401 depicts the variation in relative optical power for a typical blue LED 212, which is a narrow-band light source. For this particular light source, and for narrow-band light sources in general, such as quantum dots and many LEDs, spectral power distribution 401 includes a distinct peak wavelength 4. Also shown are passbands 402A-402C, which indicate the various ranges of wavelengths that can pass through color filter assembly 230, i.e., red light, green light, and blue light. In the blue light regime, passband 402C extends from a lower wavelength $\lambda_1$, for example and without limitation 440 nm, to an upper wavelength $\lambda_2$, for example and without limitation 470 nm. Because a peak wavelength $\lambda_p$ of blue LEDs 212, in this embodiment, is within passband 402C, the passband is considered "matched to" or "tuned to" the light source associated with spectral power distribution 401 and vice versa. Consequently, the majority of optical energy associated with the light source (i.e., blue LEDs 212) passes through color filter assembly 230 and is not lost.

Similarly, when passband 402B is suitably matched to the green light emissions of QD substrate 220, the majority of optical energy associated with the green light emissions of QD substrate 220 is not attenuated. Furthermore, when passband 402C is suitably matched to the red light emissions of QD substrate 220, the majority of optical energy associated with the red light emissions of QD substrate 220 is not attenuated.

It is noted that while spectral power distribution 401 may be considered qualitatively representative of a spectral power distribution associated with the red light emission of QD substrate 220, the green light emission of QD substrate 220, or blue light emitted by BLU 210, spectral power distribution 401 varies significantly from the spectral power distribution of a typical white LED light source. For reference, a spectral power distribution 403 of a typical white LED light source is also depicted in FIG. 4. As shown, spectral power distribution 403 includes a peak wavelength $\lambda_3$ approximately corresponding to blue light, and a broad secondary peak 404, that does not correspond to either green light (at ca. 510 nm) or red light (at ca. 650 nm). Consequently, neither passband 402B (associated with passing green light) of color filter assembly 230 nor passband 402C (associated with passing red light) of color filter assembly 230 can be matched to the light emitted by a white LED light source.

In some embodiments, the above-described matching of passband 402B and the green light emission of QD substrate 220 may be accomplished by designing passband 402B to correspond to wavelengths of the green light emission of QD substrate 220 when illuminated by BLU 210. In other embodiments, the configuration of quantum dots of QD substrate 220 (e.g., quantum dot size, shape, and/or composition) may be selected so that wavelengths of the green light emission of QD substrate 220, when illuminated by BLU 210, correspond to passband 402B. In yet other embodiments, both passband 402B and the configuration of quantum dots of QD substrate 220 are selected to correspond to a target wavelength band, such as a wavelengths or wavelengths of green light that enhance the color gamut of display device 150. The matching of passband 402C and the red light emission of QD substrate 220 may be similarly accomplished.

LC panel 240 is the liquid-crystal portion of display device 150, and may be a thin-film-transistor liquid-crystal display (TFT LCD). LC panel 240 is configured to generate images for display by selectively allowing a targeted quantity of light through each subpixel of LC panel 240. For example, and without limitation, each subpixel of LC panel 240 may include a twisted nematic liquid crystal, multi domain view alignment (MVA) liquid crystal, or in-panel switching IPS type liquid crystal, that controls the intensity of light allowed to pass though the subpixel. In some embodiments, a touch-sensitive panel or other gesture-sensitive structure configured for receiving various input techniques (for example and without limitation, infra-red touch or other like techniques) may be disposed on the outer surface of LC panel 240.

LC panel 240 also includes, without limitation, a color subpixel array that defines the color of each subpixel of LC panel 240, where each pixel includes a red, green, and blue subpixel. The color subpixel array includes, without limitation, a plurality of red, green, and blue color filters that are arranged to overlay the subpixels of LC panel 240. Generally, the color filter array of LC panel 240 is formed on a single substrate, and is configured so that a red filter is aligned with each red sub-pixel of LC panel 240, a green filter is aligned with each green sub-pixel of LC panel 240, and a blue filter is aligned with each blue sub-pixel of LC panel 240. The wavelength band associated respectively with the red, green, and blue filters of the color subpixel array is generally selected so that when a maximum intensity of light from BLU 210 is allowed to pass through all three light filters of a particular pixel of LC panel 240, white light is generated that corresponds as closely as practicable to the CIE Standard Illuminant D65.

In sum, various embodiments set forth systems and techniques for a wide color gamut LCD display device for a vehicle infotainment system. The display device includes a blue-LED-based light source and a quantum-dot material configured to convert a portion of the light emitted by the blue-LED-based light source into a red light emission and a green light emission. Advantageously, the display device has broader and more vibrant color than white-LED-based display devices. In addition, because the red light emission and the green light emission can be matched to the color filters typically included in the display device, less optical energy is lost in the color filters, thereby increasing the efficiency of the display device.

Figure 5:
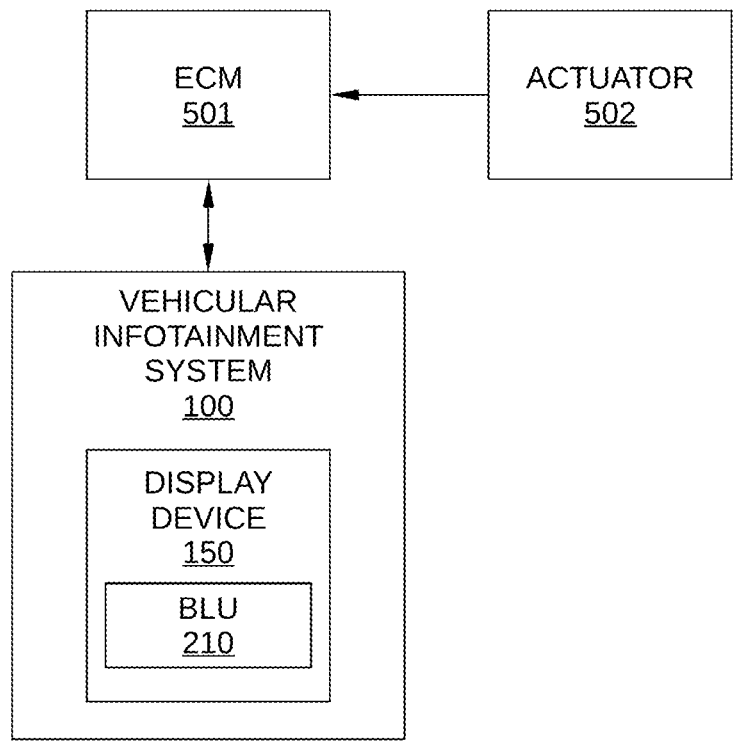
FIG. 5 is a block diagram illustrating the vehicular infotainment system of FIG. 1 in communication with an electronic control module of a vehicle, according to the various embodiments.

FIG. 5 is a block diagram illustrating vehicular infotainment system 100 in communication with an electronic control module (ECM) 501 of a vehicle, according to the various embodiments. As shown, in some embodiments, vehicular infotainment system 100 is in communication with an electronic control module 501 that is associated with a vehicle that includes vehicular infotainment system 100. In addition, electronic control module 501 is further in communication with an actuator 502 that is also associated with the vehicle. Actuator 502 may be incorporated in a key fob associated with the vehicle, an ignition switch for the vehicle, or the like. The key fob may be configured to implement remote keyless entry, which also signals activation of the ECM. Alternatively, the key fob may include a physical key which engages with the ignition switch and in turn activates the ECM. Upon receiving a signal from actuator 502, ECM 501 may transmit a "wake signal" to vehicular infotainment system 100, such that BLU 210 in display device 150 is powered on. This arrangement provides for an enhanced infotainment display in a vehicle that can withstand the extreme temperature and humidity conditions that may be experienced in the vehicle.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system. Accordingly, aspects of the present disclosure may take the form of an entirely hardware embodiment, or an embodiment combining software and hardware aspects that may all generally be referred to herein as a "circuit," "module" or "system."

Aspects of the present disclosure are described above with reference to block diagrams of apparatus (systems) according to embodiments of the disclosure. The block diagrams in the figures illustrate the architecture, functionality, and operation of possible implementations of systems according to various embodiments of the present disclosure.

While the preceding is directed to embodiments of the present disclosure, other and further embodiments of the disclosure may be devised without departing from the basic scope thereof, and the scope thereof is determined by the claims that follow.

The claimed invention is:

1. A display device, comprising:
   a light source that includes a blue light-emitting diode (LED) configured to generate a blue output light;
   a nano-particle semiconductor material configured to:
      receive the blue output light,
      convert a first portion of the blue output light to a green light emission,
      convert a second portion of the blue output light to a red light emission, and
      transmit a remainder portion of the blue output light;
   a polarizing filter positioned between the light source and the nano-particle semiconductor material;
   a liquid crystal module configured to receive the green light emission, the red light emission, and the remainder portion of the blue output light and generate an image that includes a portion of the green light emission, a portion of the red light emission, and a portion of the remainder portion of the blue output light, wherein the nano-particle semiconductor material is positioned between the polarizing filter and the liquid crystal module; and
   a color filter assembly disposed within the display device to receive the red light emission, the green light emission, and the remainder portion of the blue output light, wherein the color filter assembly is configured with a first passband that is configured based on a peak wavelength of the red light emission, a second passband that is configured based on a peak wavelength of the green light emission, and a third passband that includes a peak wavelength of the remainder portion of the blue output light.

2. The display device of claim 1, wherein the color filter assembly is disposed in an optical path between the nano-particle semiconductor material and the liquid crystal module.

3. The display device of claim 1, further comprising a color subpixel array that includes a plurality of red filters to define a color of red subpixels of the liquid crystal module, a plurality of green filters to define a color of green subpixels of the liquid crystal module, and a plurality of blue filters to define a color of blue subpixels of the liquid crystal module.

4. The display device of claim 3, wherein a color of red filters included in the color subpixel array is based at least in part on the first passband, a color of green filters included in the color subpixel array is based at least in part on the second passband, and a color of blue filters included in the color subpixel array is based at least in part on the third passband.

5. The display device of claim 3, wherein the color subpixel array is included in the liquid crystal module.

6. The display device of claim 1, wherein the nano-particle semiconductor material includes at least one of quantum dots or quantum rods.

7. The display device of claim 1, wherein in combination, the red light emission, the green light emission, and the remainder portion of the blue output light produce a white light substantially equivalent to International Commission on Illumination (CIE) Standard Illuminant D65.

8. A vehicle infotainment system, comprising:
   a processor configured to generate digital images; and
   a display device for displaying the digital images that includes:
      a light source that includes a blue light-emitting diode (LED) configured to generate a blue output light;
      a nano-particle semiconductor material configured to receive the blue output light and convert a portion of the blue output light to a different color light and transmit a remainder portion of the blue output light;
      a polarizing filter positioned between the light source and the nano-particle semiconductor material;
      a liquid crystal module configured to receive the different color light and the remainder portion of the blue output light and generate an image that includes a portion of the different color light and a portion of the remainder portion of the blue output light, wherein the nano-particle semiconductor material is positioned between the polarizing filter and the liquid crystal module; and
      a color filter assembly disposed within the display device to receive the different color light and the remainder portion of the blue output light, wherein the color filter assembly is configured with a first passband that is configured based on a peak wavelength of the different color light and a second passband that is configured based on a peak wavelength of the remainder portion of the blue output light.

9. The vehicle infotainment system of claim 8, wherein the nano-particle semiconductor material is configured to convert the portion of the blue output light to a green light emission and a red light emission.

10. The vehicle infotainment system of claim 8, wherein the processor is further configured to:
    receive a wake-up signal from an electronic control module of a vehicle; and
    cause the display device to power on.

11. The vehicle infotainment system of claim 10, wherein the electronic control module of the vehicle generates the wake-up signal in response to an actuator associated with the vehicle activating the electronic control module.

12. The vehicle infotainment system of claim 11, wherein the actuator activates the electronic control module by implementing a remote keyless entry protocol or engaging an ignition switch of the vehicle.

13. The vehicle infotainment system of claim 8, wherein the different color light includes a red light emission and a green light emission.

14. The vehicle infotainment system of claim 13, wherein the peak wavelength of the different color light comprises a peak wavelength of the red light emission, and wherein the color filter assembly is further configured with a third passband that is configured based on a peak wavelength of the green light emission.

15. The vehicle infotainment system of claim 8, wherein the color filter assembly is disposed in an optical path between the nano-particle semiconductor material and the liquid crystal module.

16. The vehicle infotainment system of claim 8, further comprising a color subpixel array that includes a plurality of red filters to define a color of red subpixels of the liquid crystal module, a plurality of green filters to define a color of green subpixels of the liquid crystal module, and a plurality of blue filters to define a color of blue subpixels of the liquid crystal module.

17. The vehicle infotainment system of claim 16, wherein a color of red filters included in the color subpixel array is based at least in part on the first passband and a color of blue filters included in the color subpixel array is based at least in part on the second passband.

18. The vehicle infotainment system of claim 8, wherein the nano-particle semiconductor material includes at least one of quantum dots or quantum rods.

\* \* \* \* \*